United States Patent
Ogata et al.

(10) Patent No.: US 6,972,389 B2
(45) Date of Patent: Dec. 6, 2005

(54) METHOD AND APPARATUS FOR PREPARING PROGRAM FOR DIE MACHINING

(75) Inventors: Toshiyuki Ogata, Yamanashi (JP); Shigetoshi Takagi, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/798,288

(22) Filed: Mar. 12, 2004

(65) Prior Publication Data

US 2004/0178179 A1 Sep. 16, 2004

(30) Foreign Application Priority Data

Mar. 12, 2003 (JP) .............................. 2003-066916

(51) Int. Cl.⁷ .......................... B23H 7/02; B23H 7/20; G06F 19/00
(52) U.S. Cl. ................... 219/69.12; 700/162
(58) Field of Search .......................... 219/69.12, 69.17; 700/162

(56) References Cited

U.S. PATENT DOCUMENTS 4,914,599 A * 4/1990 Seki et al. .................. 700/166
5,113,050 A * 5/1992 Seki et al. ................ 219/69.12
6,356,799 B1 * 3/2002 Takegahara et al. ........ 700/182

FOREIGN PATENT DOCUMENTS

| EP | 57-54024 | | 3/1982 |
|---|---|---|---|
| EP | 0 44 202 A1 | | 9/1991 |
| EP | 0 488 026 A2 | | 6/1992 |
| EP | 0 692 333 A1 | | 1/1996 |
| JP | 58-171220 | | 10/1983 |
| JP | 4-115822 A | * | 4/1992 |
| JP | 4-189421 A | * | 7/1992 |
| JP | 5-277835 A | * | 10/1993 |

* cited by examiner

Primary Examiner—Geoffrey S. Evans
(74) Attorney, Agent, or Firm—Staas & Halsey LLP

(57) ABSTRACT

When die machining including machining processes from a rough machining process to a finish machining process is carried out on the same workpiece along a closed machining path, each of the points equally dividing a length of the closed machining path by the repetition number of machining processes is defined as an approach point, so that the approach points are different from each other for each machining process. This makes it possible to avoid a concentration of the approach points at one points thereby preventing a dent from being formed at the approach point.

15 Claims, 7 Drawing Sheets

MACHINING PROGRAM:

G01G42X10.
G02X_Y_I-10.
M01
X10.Y0I_J_
M00
X0

MACHINING PROGRAM:

G01G41Y-10.
G03J10.
Y0

MACHINING PROGRAM:

G01G42X10.
G02X_Y_I-10.
M01
X10.Y0I_J_
M00
X0

MACHINING PROGRAM:

G01G41Y-10.
G03J10.
Y0

MACHINING PROGRAM:

G01G42X-10.
G02I10.
X0

MACHINING PROGRAM:

G01G41Y10.
G03J-10.
Y0

MACHINING PROGRAM:

G01G42X10.
G02X_Y_I-10.
M01
X10.Y0I_J_
M00
X0

MACHINING PROGRAM:

G01G41X10.
G03I-10.
X0

MACHINING PROGRAM:

G01G42X10.
G02I-10.
X0

MACHINING PROGRAM:

G01G41X10.
G03I-10.
X0

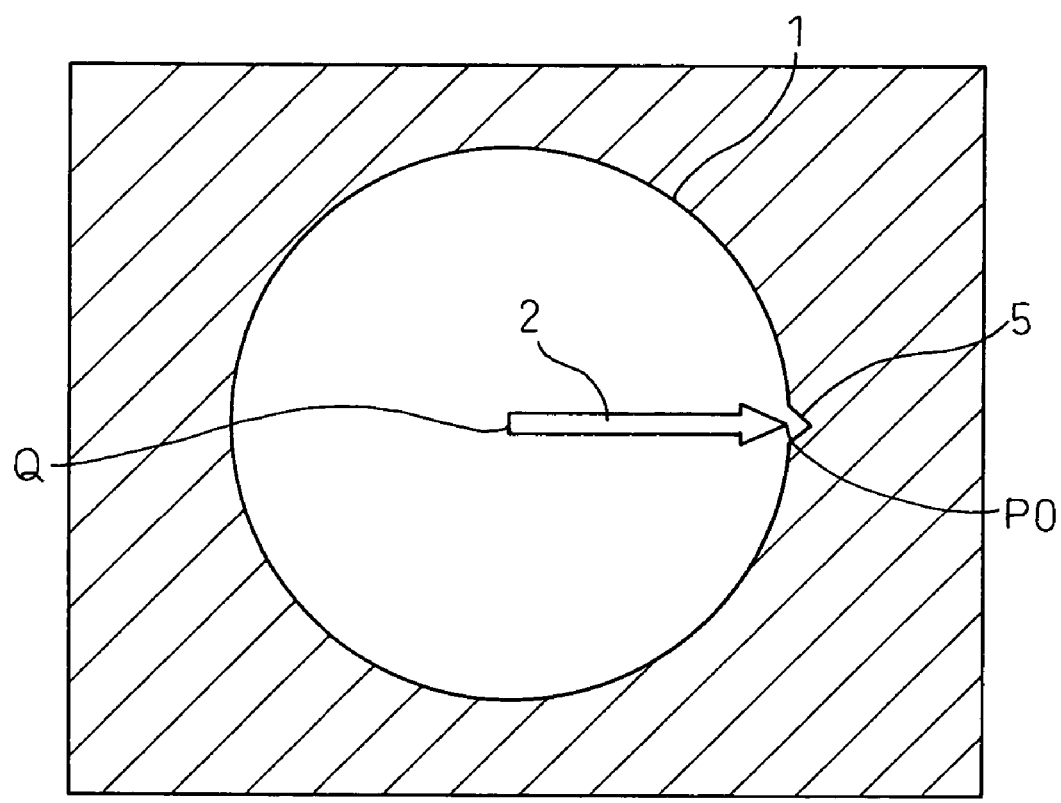

METHOD AND APPARATUS FOR PREPARING PROGRAM FOR DIE MACHINING

BACKGROUND OF THE INVENTION

1. Field of the Invention

The present invention relates to a method for carrying out die machining by wire-cut electric discharge machining, a method and an apparatus for preparing a program for die machining, a wire-cut electric discharge machining apparatus provided with the apparatus for preparing a program for die machining, and a storage medium for storing a program for die machining.

2. Description of the Related Art

When die machining, for machining a workpiece into a die, is carried out by wire-cut electric discharge machining, a plurality of machining processes including a rough machining process to a finish machining process are repeated on the same workpiece. In this case, the wire-cut electric discharge machining is always started at the same approach point and is repeated, along the same path, for all the machining processes from the rough machining process to the fine machining process.

FIGS. 7A to 7D illustrate one example of conventional die machining in which the die machining is carried out along a circular path. A machining path of a wire electrode is shown on the left side of FIGS. 7A to 7D, while an exemplary program for carrying out the die machining along the above machining path is shown on the right side of FIGS. 7A to 7D. In FIGS. 7A to 7D, reference numeral 1 denotes a circular machining shape and arrows with reference numerals 2, 3 and 4 denote the machining paths of the wire electrode. In this example, four machining processes are carried out. In the coordinate system of FIGS. 7A to 7D, the rightward direction is represented by "+X" and the upward direction is represented by "+Y".

During a first machining process, the wire electrode at first travels from a machining-start point Q (in coincidence with a center of the machining shape circle 1 in this example, defined by the coordinate X=0 and Y=0) to an approach point P0 along a linear path in accordance with the linear interpolation command. The approach point P0 is defined as a position away from the machining-start point Q by an amount of "10" in the "+" direction on the X coordinate. A command "G01G42X10." is programmed for further correcting the offset amount in the rightward direction with regard to an advancement direction of the wire electrode. According to this command, the wire electrode carries out the wire-cut electric discharge machining while linearly traveling from the machining-start point Q to the approach point P0 as shown by an arrow 2. Then, a command "G02X_Y_I-10." is programmed for appointing a final point (X, Y) on the machining shape circle 1 so that a predetermined reserved section is left and for carrying out the clockwise arcuate interpolation. Thus, the wire electrode carries out the wire-cut electric discharge machining along the machining shape circle 1 (or the circular machining path) as shown by an arrow 3. The electric discharge machining is temporarily stopped when the wire electrode reaches the final point (command "M01"). Then, the operator actuates a start button on the machine-operating panel to carry out the cut-off machining as shown by an arrow 4 (command "X10.Y0I_J_"). Upon the completion of the cut-off machining, the motion of the wire electrode is stopped (command "M00"), and a cut-off core is removed. Thereafter, the wire electrode returns to the machining-start point Q (i.e., the center of the machining shape circle 1).

During a second machining process, a linear feeding command using the linear interpolation from the machining-start point Q (the center of the machining shape circle) to the approach point P0 is issued. In this second machining process, the approach point P0 is similarly defined as a position away from the machining-start point Q by the amount of "10" in the "+" direction on the X coordinate. A command "G01G41X10." is programmed for further correcting the offset amount in the leftward direction with regard to the advancement direction of the wire electrode. Subsequently thereto, a command ("G03I-10.") is programmed for carrying out the counterclockwise arcuate interpolation along the machining shape circle 1 (or the closed circular machining path). Regarding a command relating to (I, J) representing a center position of the interpolation arc wherein I is the X coordinate value and J is the Y coordinate value, J=0 is eliminated and only "I=-10." is programmed in FIG. 7B. In accordance with the above-mentioned programs, the wire electrode travels in a direction opposite to that in the first machining process so that a first finish machining process is carried out along the whole circumference of the machining shape circle.

During a third machining process, a linear feeding command for carrying out the linear interpolation from the machining-start point Q to the approach point P0 (command "G01G42X10.") is programmed. Subsequently thereto, a clockwise arcuate interpolation command ("G02-10.") is programmed, so that a second finish machining process is carried out along the machining shape circle 1 or the closed circular machining path.

Similarly, a fourth machining process (a third finish machining process) is programmed to be carried out counterclockwise, so that the wire electrode travels counterclockwise, as shown by an arrow 3, along the machining shape circle 1 or the closed circular machining path to carry out the finish machining process along the machining shape circle 1.

As described above, in conventional die machining, a plurality of times of machining are executed by the repetition of the travel of the wire electrode from the machining-start point Q to the approach point P0 and along the machining shape circle 1 alternately in opposite directions.

As described above, in conventional die machining in which a plurality of machining processes including the rough machining process and the finish machining process are repeated, the approach point P0 is fixed at the same location in every machining. Accordingly, as shown in FIG. 8, as the machining process is repeated, a recessed dent 5 is liable to be formed at the approach point P0.

SUMMARY OF THE INVENTION

Therefore, an object of the present invention is to eliminate the above-mentioned drawback of the prior art and to provide a method of carrying out die machining, a method and an apparatus of preparing a program for die machining, and a storage medium for storing a program for die machining.

According to a first aspect of the present invention, a method for preparing a program for die machining is provided, which program repeats a plurality of machining processes along a predetermined closed machining path during wire-cut electric discharge machining to thereby machine a workpiece into a die. The method includes a step of preparing a program for die machining so that approach points, which are machining-start points on the machining path, are different from each other in different machining processes. The die machining program may be a program in which a plurality of finish machining processes are repeated after coreless machining.

Preferably, the above-mentioned method further includes steps of obtaining points equally dividing a circumferential length of the closed machining path by the repetition number of the machining processes; and defining each of the obtained points as an approach point for a different machining process. More preferably, the defining step includes a step of, when the obtained point is positioned within a first predetermined distance from a corner of the machining path or a curved section thereof having a curvature larger than a predetermined value, defining, as an approach point, a point away from the corner or the curved section along the predetermined machining path by a second predetermined distance.

According to a second aspect of the present invention, an apparatus for preparing a program for die machining, used in wire-cut electric discharge machining based on a machining shape input thereto, is provided. The apparatus includes machining path defining means for defining a closed machining path from the machining shape input thereto; and program preparing means for preparing a program for die machining, which program repeats a plurality of machining processes along the closed machining path to thereby machine a workpiece into a die. The program preparing means-prepares the program so that approach points, which are machining-start points on the machining path, are different from each other in different machining processes. The die machining program may be a program in which a plurality of finish machining processes are repeated after coreless machining.

Preferably, the apparatus further includes approach point defining means for obtaining points equally dividing the machining path by an input repetition number of the machining processes and defining each of the obtained points as an approach point for a different machining process. More preferably, when the obtained point is positioned within a first predetermined distance from a corner of the machining path or a curved section thereof having a curvature larger than a predetermined value, the approach point defining means defines, as an approach point, a point away from the corner or the curved section, along the machining path, by a second predetermined distance.

According to a third aspect of the present invention, a computer readable storage medium is provided for storing a program for preparing a program for die machining used in wire-cut electric discharge machining. The program repeats a plurality of machining processes along a predetermined closed machining path to thereby machine a workpiece into a die and is prepared so that approach points, which are machining-start points on the machining path, are different from each other in different machine processes. The die machining program may be a program in which a plurality of finish machining processes are repeated after coreless machining.

According to a fourth aspect of the present invention, a method for carrying out die machining by wire-cut electric discharge machining is provided. The method includes a step of repeating a plurality of machining processes along a predetermined closed machining path so that approach points, which are machining-start points on the closed machining path, are different from each other in different machining processes, thereby machining a workpiece into a die. The die machining may be machining in which a plurality of finish machining process is repeated after coreless machining.

Preferably, the method further includes steps of obtaining points equally dividing a circumferential length of the closed machining path by a repetition number of the machining processes; and defining each of the obtained points as an approach point for a different machining process. More preferably, the defining step includes a step of, when the obtained point is positioned within a first predetermined distance from a corner of the machining path or a curved section thereof having a curvature larger than a predetermined value, defining, as an approach point, a point away from the corner or the curved section, along the predetermined machining path, by a second predetermined distance.

According to a fifth aspect of the present invention, a wire-cut electric discharge machining apparatus provided with the above-mentioned apparatus for preparing a program for die machining.

BRIEF DESCRIPTION OF THE DRAWINGS

The above and other objects, features and advantages of the present invention will be described in more detail below based on the preferred embodiments with reference to the accompanying drawings, wherein

FIG. 8 is an illustration of a dent formed at the approach point in the conventional die machining method.

DETAILED DESCRIPTION

FIGS. 1A to 1D are diagrams illustrating machining processes of die machining carried out in accordance with one embodiment of a program for die machining prepared by the present invention as well as machining programs corresponding the respective machining processes. FIGS. 1A to 1D illustrate an example in which a workpiece is machined into the same circular machining shape 1 as that of a conventional die machining method shown in FIG. 7.

Figure 7A:
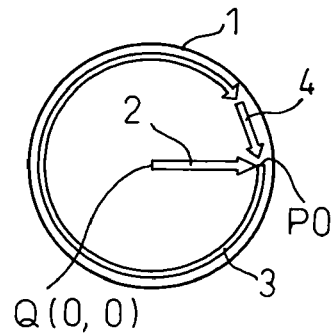
FIGS. 7A to 7D are diagrams illustrating processes of die machining carried out in accordance with the conventional program for die machining as well as machining programs corresponding the respective processes.
Figure 7B:
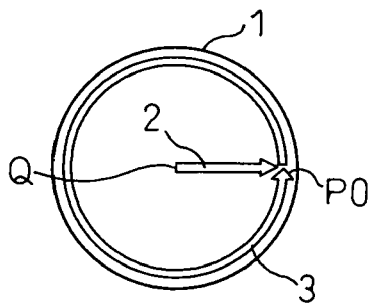
Figure 7C:
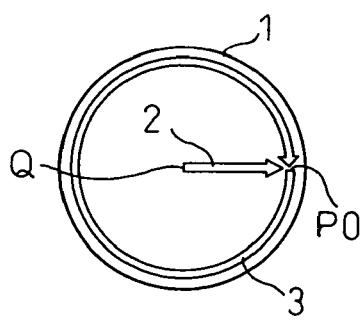
Figure 7D:
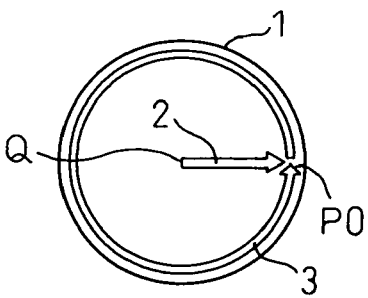

A first machining process is the same as the conventional machining process shown in FIG. 7A and the corresponding machining program is also the same.

However, during a second machining process, an approach point P1 which is a machining-start point of the wire electrode on the closed machining path is set at a position advanced clockwise by a quarter of the circumference of the machining shape circle 1 from the approach point P0 for the first machining process. In other words, a command "G01G41Y–10." is written, in the machining program, to make the wire electrode travel from the machining-start point Q to the approach point P1 away from the machining-start point Q by an amount of "10" in the "–" direction on the Y coordinate.

Next, a machining command "G03J10." is programmed for making the wire electrode travel in a direction opposite to the first machining direction (counterclockwise) once around the machining shape circle 1 to machine the same workpiece as in the first machining process. In this regard, as a position of the center of the machining shape circle 1 relative to the approach point P1 is I=0 and J=10, the command in the program becomes only "J10" with I=0 eliminated therein.

During a third machining process, a command "G01G42X–10." is programmed for defining, as an approach point, a point P2 advanced clockwise on the machining shape circle 1 by a quarter of the circumference thereof from the approach point P1 for the second machining process. In the third machining process, a machining command "G02I10." is programmed to make the wire electrode travel once around the machining shape circle 1 in a direction opposite to the machining direction for the second machining process (i.e., in the same direction (forward direction) as that for the first machining process).

During a fourth machining process, a command "G01G41Y10." is programmed for defining, as an approach point, a point P3 advanced clockwise on the machining shape circle 1 by a quarter of the circumference thereof from the approach point P2 for the third machining process. In the fourth machining process, a machining command "G03J–10." is programmed for making the wire electrode travel once around the machining shape circle 1 in a direction opposite to that for the third machining process (the reverse machining direction).

As described above, by changing the approach point P along the machining shape in different machining processes when a plurality of machining processes of the wire-cut electric discharge machining including the rough machining process and the finish machining process are carried out on the same workpiece, it is possible to prevent the dent (shown as a recessed portion referred by a reference numeral 5 in FIG. 8) from being formed, which dent is generated because the approach point is unchanged throughout a plurality of machining processes.

Figure 4A:
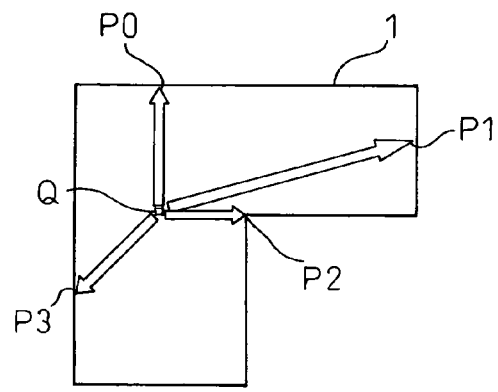
FIGS. 4A and 4B are illustrations for explaining how the approach point is changed when the approach point is close to a corner section of a machining shape in the preparation of the program for die machining in accordance with the present invention.
Figure 4B:
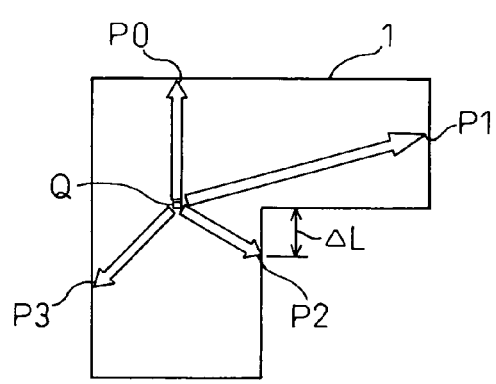
Figure 5A:
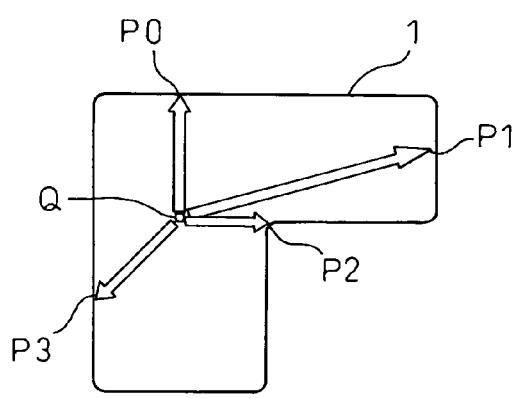
FIGS. 5A and 5B are illustrations for explaining how the approach point is changed when the approach point is close to a curved section having a curvature larger than a predetermined value in the preparation of the program for die machining in accordance with the present invention.
Figure 5B:
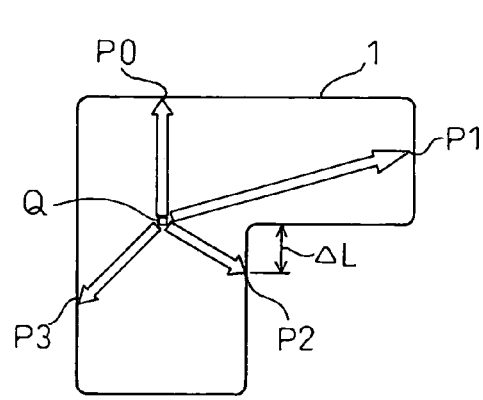

In the above-mentioned embodiment, a total length of the circumference of the machining shape is equally divided by the number of the machining processes, and each of the dividing points is defined as a different approach point P for a different machining process. However, in a case of the die machining of the machining shape having a plurality of bending sections as shown in FIG. 4A, when the obtained approach point is positioned within a predetermined range from a bending section (a corner section), a point shown away from the corner by a predetermined amount ΔL as shown in FIG. 4B is defined as the approach point. Also, when the obtained approach point is positioned within a predetermined range from a curved section having a curvature larger than a predetermined value as shown in FIG. 5A, the approach point is moved as shown in FIG. 5B.

Alternatively, instead of defining, as an approach point P, one of points equally dividing the total length of the machining shape by the number of machining processes, a point advanced by a predetermined amount along the machining shape from the approach point for the preceding machining process may be a approach point for a succeeding machining process in every machining process.

Further, a program for carrying out the above-mentioned die machining may be automatically prepared just by inputting the machining shape or others.

Figure 1A:
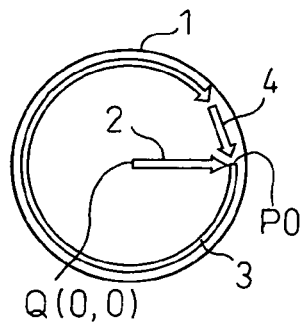
FIGS. 1A to 1D are diagrams illustrating machining processes of die machining carried out in accordance with one embodiment of a program for die machining prepared by the present invention as well as machining programs corresponding the respective machining processes.
Figure 1B:
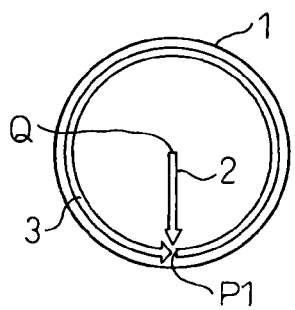
Figure 1C:
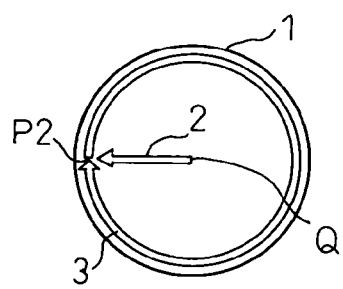
Figure 1D:
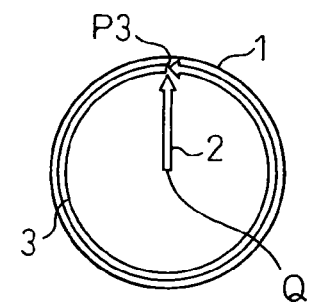
Figure 2:
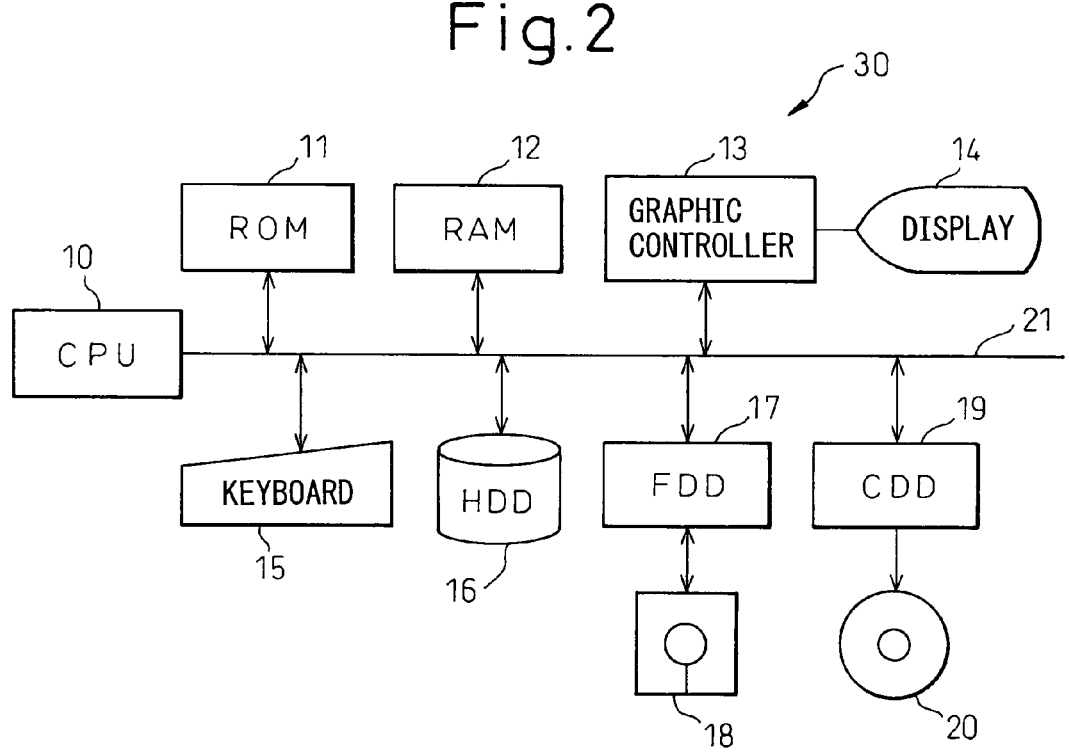
FIG. 2 is a block diagram of a main part of one embodiment of a program preparation apparatus for preparing a program for die machining in accordance with the present invention.
Figure 3:
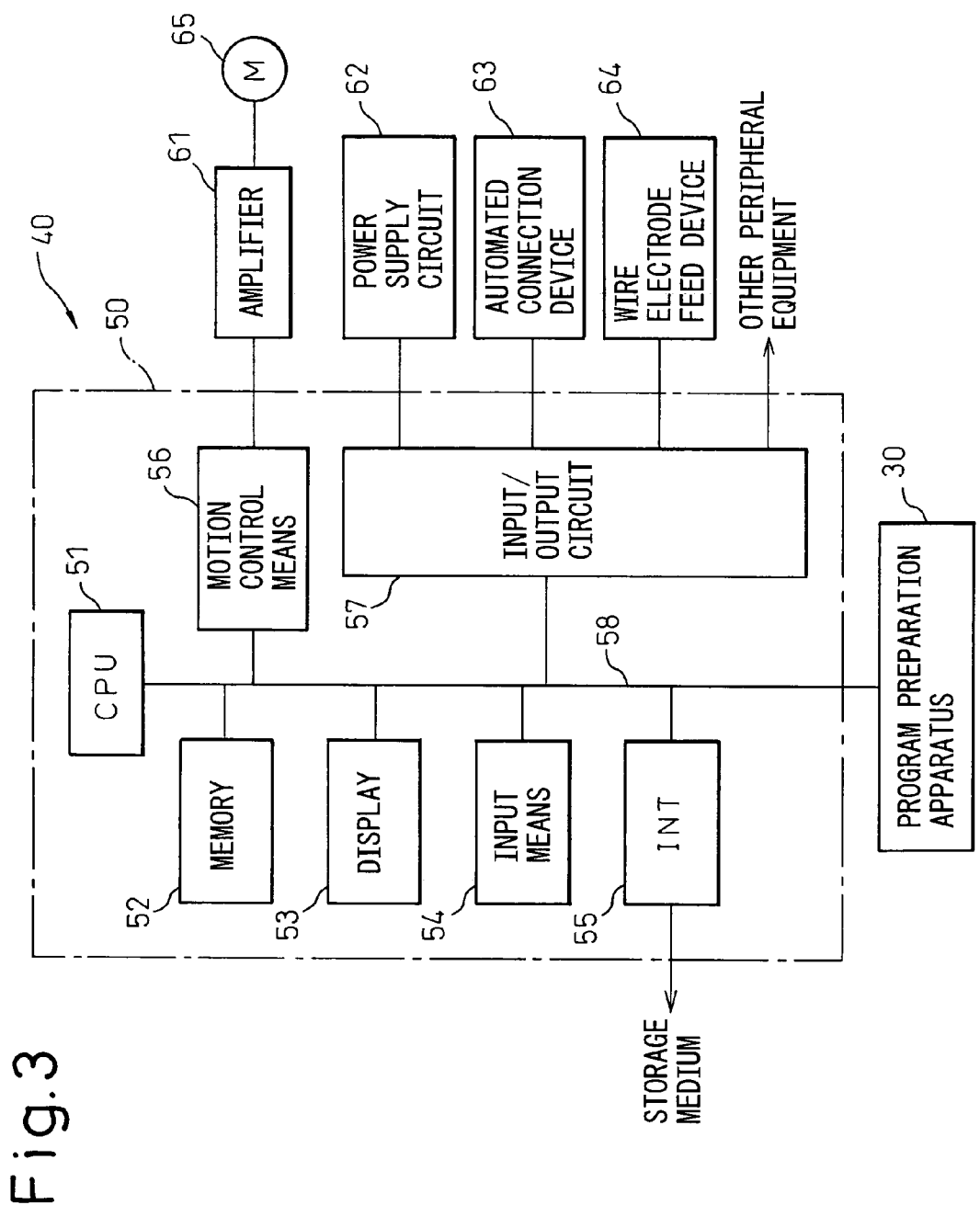
FIG. 3 is a block diagram of a main part of a wire-cut electric discharge machining apparatus provided with the program preparation apparatus shown in FIG. 2.

FIG. 2 is a block diagram of a main part of one embodiment of a program preparation apparatus for preparing a program for die machining in accordance with the present invention, and FIG. 3 is a block diagram of a main part of a wire-cut electric discharge machining apparatus shown in FIG. 2.

Referring to FIG. 3, a wire-cut electric discharge machining apparatus 40 includes a program preparation apparatus 30 for preparing a machining program, and a control unit 50 which further includes a numerical control device or the like for controlling the wire electric discharge apparatus 40.

This control unit 50 includes a processor 51, memory 52, constituted by a ROM or RAM, a display 53, input means 54 such as a keyboard, an interface 55 to input or output a machining program or the like from or to external storage media, a motion control circuitry 56 for respective axes, an input/output circuit 57, and others, which are connected to the processor 51 through a bus 58.

The motion control circuitry 56 controls X-axis and Y-axis motors for driving a table for a workpiece to be placed in X- and Y-directions orthogonal to each other, a Z-axis motor for moving an upper guide in a direction perpendicular to X- and Y-axes, and U-axis and V-axis motors used for a taper machining (U-axis and V-axis extend in orthogonal directions to each other). The motion control circuitry 56 further includes feedback control means or the like to feed back a position, speed and current of each of the motors for the axes (X, Y, Z, U and V). Servo motors 65 for the respective axes are connected to the motion control circuitry 56 through a servo amplifier 61. A position and speed detector is installed in each servo motor and is configured to feed back the position and speed to the motion control circuitry 56; however, it is omitted in FIG. 3.

The input/output circuit 57 is connected to a power supply circuit 62 for applying a voltage between the workpiece and the wire of the wire-cut electric discharge machining apparatus and to thereby cause discharge, an automated connection device 63 for passing a wire electrode through a through hole which is a machining-start point in the workpiece, a wire electrode feed device 64 for feeding the wire electrode, and other peripheral equipment.

The above-mentioned configuration of the wire-cut electric discharge machining apparatus 40 is the same as the configuration of a conventional wire electric discharge machining apparatus except that the wire-cut electric discharge machining apparatus 40 is provided with a program preparation apparatus 30.

Referring to FIG. 2, the program preparation apparatus 30 will be described in detail. The program preparation apparatus is provided with a processor (CPU) 10, which is connected to a ROM 11, a RAM 12, a graphic controller 13, a keyboard 15, a hard disk drive (HDD) 16, a floppy (registered trade mark) disk drive (FDD) 17 and a compact disk drive (CDD) 19 through a bus 21. The processor 10 controls the program preparation apparatus 30 as a whole based on a system program stored in the ROM 11. The RAM 12 is used for temporarily storing data and storing the prepared program.

The graphic controller 13 converts displayed data from the processor 10 into display signals and transmits them to a display 14. The display 14 receives these display signals and displays the same as images thereon. As the display 14, CRT (a cathode ray tube), a liquid crystal display or others may be used. The keyboard 15 is provided with operation keys, function keys and others used for inputting data or commands. The hard disk drive (HDD) 16 stores data such as the prepared program so as to be retained even after the electric power has been shut down. The floppy disk drive (FDD) 17 reads data stored in a floppy (registered trade mark) disk 18 or writes the prepared program into the floppy (registered trade mark) 18. The compact disk drive (CDD) 19 writes the prepared program into a compact disk (CD) 20 such as CD-R OR CD-RW.

The hardware structure of the above-mentioned program preparation apparatus is the same as the conventional program preparation apparatus.

The above-mentioned program preparation apparatus is different from the conventional program preparation apparatus in that a system program is stored therein for automatically preparing a program for die machining based on an input machining-shape, an input machining-start point, an input approach point and an input number of machining processes.

Figure 6:
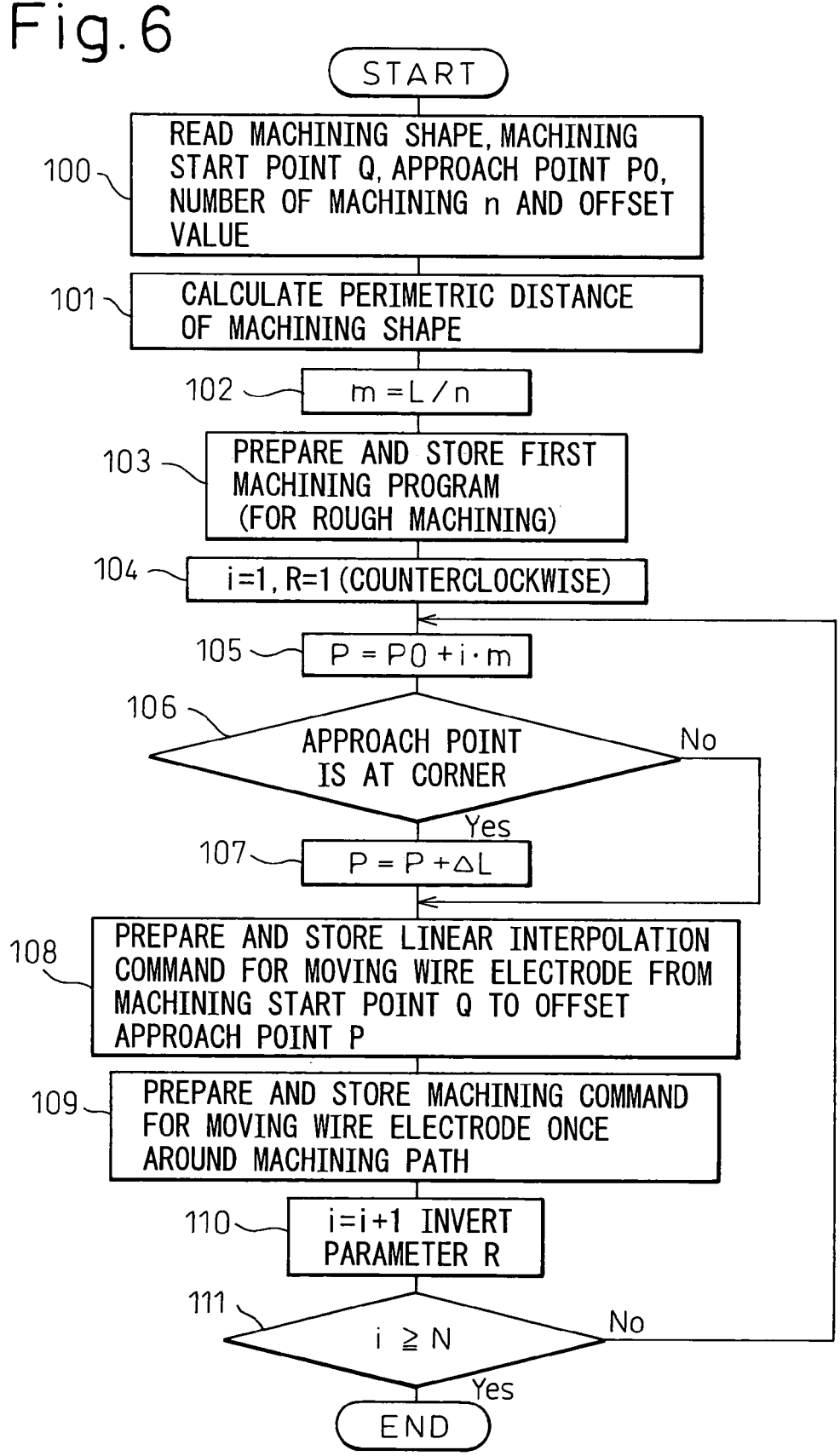
FIG. 6 is a flow chart of one embodiment of a method for preparing a program for die machining in accordance with the present invention.

FIG. 6 is a flow chart of a procedure for the program preparation apparatus 30 to prepare a program for die machining in accordance with a program for preparing a program for die machining contained in the system program of the program preparation apparatus.

When a machining shape to be machined, a machining-start point Q, an approach point P0, a number n of machining processes and an offset amount for every machining process are set and a command for preparing a program for die machining is input from the keyboard 15, the processor 10 executes the steps shown in FIG. 6.

The processor 10 reads the predetermined machining shape, the predetermined machining-start point Q, the predetermined approach point P0, the predetermined number n of machining processes and the predetermined offset amount for every machining process (step 100), and calculates a circumferential distance L of the predetermined machining shape (step 101). The calculated distance L is divided by the number n of the machining processes to result in a divided amount m (step 102). The value of m may be a value L/n itself, an integer portion thereof, a value rounded by counting fractions of 0.5 as one and disregarding the rest, or a value rounded by counting fractions as one.

Then, based on the information read at step 100, a machining program is prepared and stored in the RAM 12 (step 103), which program includes a machining travel command for making the wire electrode travel from the machining-start point Q to the approach point P (in this case, the approach point P0), a machining command for making the wire electrode travel clockwise from the approach point P to a reservation point at which a predetermined amount of a reserved portion remains along the machining path, a temporary stop command for temporarily stopping the wire electrode at the reservation point, a position command for defining the approach point P as a final position of the wire electrode travel carried out by the cut-off command being manually input, and a stop command for stopping the travel of the wire electrode at the approach point P. For example, when the machining shape 1 is a circle as shown in FIGS. 1A to 1D, the following program is made based on data read at step 100.

G01G42X10.
G02X_Y_I-10
M01
X10.Y0I_J_
M00
X0

If the machining shape is the one shown in FIGS. 4A and 4B, a program is similarly prepared, including a feeding-travel command for making the wire electrode travel from the machining-start point Q to the approach point P, a machining travel command for designating respective paths from the approach point P along the predetermined machining shape, a command for temporarily stopping the wire electrode with the uncut portion reserved, and a command for stopping the wire electrode after the cutting-off process has completed.

Then, a counter i for counting the number of machining processes is set at "1", and a register R having a bit determining the machining direction is set at "1" (step 104). If "0" is set in the register R, the same machining direction and offset correction direction as in the first machining process (in this embodiment, clockwise) is indicated. On the other hand, if "1" is set in it, a machining direction and offset-correction direction opposite to in the first machining process (in this embodiment, counterclockwise) is indicated.

Subsequently, the approach point P0 read at step 100 is added with a value obtained by multiplying the value of the counter i by the divided amount m obtained at step 102 to result in the approach point P for the machining process at this time (step 105). It is determined whether or not the obtained position P is positioned within a first predetermined length from a corner section (step 106). As shown in FIG. 4A, when the approach point P obtained at step 105 is positioned within the first predetermined distance from the corner section which is at a join between the paths of the machining shape, the second predetermined distance ΔL is added to indicate a new point which is defined as a approach point P (step 107). Contrarily, if the approach point P obtained at step 105 is not positioned within the first predetermined length, that point is defined as the approach point P as it is.

Next, a travel command is prepared for carrying out linear interpolation from the machining-start point Q to the obtained approach point P while carrying out an offset correction in the offset correction direction determined by a value stored in the register R (step 108), and a travel command is further prepared and stored for determining whether the direction of the travel of the wire electrode is clockwise or counterclockwise and making the wire electrode travel once around the machining shape (step 109).

In the second machining process in the embodiment shown in FIGS. 1A to 1D, as it is in a condition of i=1 and R=1, the wire electrode travels counterclockwise and the approach point P is defined as a position advanced clockwise along the machining shape circle (or the machining path) by i×m=1×(L/4) from the approach point P0 read at step 100. Therefore, a program is prepared and stored in the RAM 12 subsequent to the first program store therein, including a travel command for carrying out linear interpolation from the machining-start point Q to the approach point P (step 108) and a command for designating a closed machining path extending once around the machining shape from the approach point P (step 109). In other words, in the embodiment shown in FIGS. 1A to 1D, the following program is newly prepared and additionally stored in the RAM 12.

G01G41Y–10.
G03J10.
Y0

Then, "1" is added to the counter i and "1" is added to the register R to invert the value stored therein ("1" becomes "0" or "0" becomes "1"), and it is determined whether or not the value in the counter i is the number n of machining processes or more (steps 110 and 111). If the value in the counter i does not reach the number n of machining processes, a routine returns to step 105 and the steps subsequent thereto are repeated. In such a case, as "1" is added to the counter i, the approach point P is advanced clockwise by the divided amount m corresponding to the added value. In other words, in the embodiment shown in FIGS. 1A to 1D, when the value in the counter i becomes "2", the approach point P is defined as P=P0+2×(L/4), so that a new approach point is defined as a point P2 advanced clockwise from the approach point P0 for the first machining process by ½ of the circumference along the machining shape. Also, as the value in the register R is inverted to be "0", the offset correction direction and travel direction are opposite to those for the second machining process. Thus, the following program in which the wire electrode travels in the same direction (clockwise) as those for the first machining process is prepared and stored in the RAM 12.

G01G42X–10.
G02I10.
X0

As "1" is added to the counter i and the register R is inverted at step 110 so that it is in a condition of i= 3 and R=1, the approach point P for the fourth machining process is defined as P=P0+3×L/4 and a program for making the wire electrode travel counterclockwise once around the machining shape is prepared and stored in the RAM 12.

G01G41Y10.
G03J–10.
Y0

When "1" is added to the counter i (step 110) and the value in the counter i reaches the number n of machining processes (when i reaches n=4 in the embodiment shown in FIGS. 1A to 1D), the procedure for preparing the program for die machining is finished.

The program thus produced is transferred from the RAM 12 to the hard disk drive 16 and stored in a hard disk thereof. Also, it may be written on the floppy (registered trade mark) disk 18 and the compact disk (CD) 20 through the floppy (registered trade mark) disk drive (FDD) 17 and the compact disk drive (CDD) 19, respectively.

In the above-mentioned embodiments, the approach points are defined as points equally dividing a length of the machining path on the machining shape by the number of machining processes, while a new approach point for every subsequent machining process may be determined by advancing an old approach point for every preceding machining process by a predetermined length along the machining path. In such a case, step 102 is unnecessary and, instead of the divided amount m, a predetermined value m is used at step 105. In this case, the predetermined value m is selected to satisfy the following formula:

m×n<a total length L of the machining shape
where n is the number of machining processes.

Also if the program for preparing the program for die machining shown in FIG. 6 is stored in the floppy (registered trade mark) disk 18 or CD 20 such as CD-R or CD-RW and is read by the conventional program preparation apparatus, it can prepare the above-mentioned program for die machining solely by inputting the machining shape, the machining-start point, the approach point, the number of machining processes or others.

Further, the programming function of the above-mentioned program preparation apparatus may be incorporated into the controller of the wire-cut electric discharge machining apparatus; i.e., the above-mentioned program for preparing the program for die machining is stored in the controller of the wire-cut electric discharge machining apparatus, so that the wire-cut electric discharge machining apparatus itself can prepare the program for die machining and execute the same to carry out die machining.

The finish machining process is carried out after the rough machining process has been executed in the above-mentioned embodiments. However, if the rough machining process is carried out by coreless machining, the present invention may be applied to the finish machining processes which are repeated many times such that approach points are different from each other for each finish machining process. This-case is substantially the same as the above-mentioned embodiments except that the first machining process is not the rough machining process but the finish machining process.

According to the program for die machining prepared by the present invention, in the case that a plurality of machining processes including the rough machining process and the finish machining process are repeated, it is possible to avoid the formation of the dent at the approach point, thereby achieving more accurate die machining.

While the present invention has been described above with reference to the preferred embodiments shown in the attached drawings, these embodiments are exclusively illustrative and not intended to limit the invention. Accordingly, the present invention should be solely defined by the scope of claim for patent, and can be variously modified and changed without departing from the scope of claim for patent.

What is claimed is:

1. A method for preparing a program for die machining to be performed by a computer, said program repeating a plurality of machining processes along a predetermined closed machining path during wire-cut electric discharge machining to thereby machine a workpiece into a die, said method comprises:
   a computer preparing a program for die machining so that approach points, which are machining-start points on the machining path, are different from each other in different machining processes.

2. The method according to claim 1, wherein said program comprises a program in which a plurality of finish machining processes are repeated after coreless machining.

3. The method according to claim 1, further comprising:
   obtaining points equally dividing a circumferential length of the closed machining path by a repetition number of the machining processes; and
   defining each of the obtained points as an approach point for a different machining process.

4. The method according to claim 3, wherein the defining comprises:
   defining, as an approach point, a point away from the corner or the curved section along said predetermined machining path by a second predetermined distance when the obtained point is positioned within a first predetermined distance from a corner of the machining path or a curved section thereof having a curvature larger than a predetermined value.

5. An apparatus for preparing a program for die machining used in wire-cut electric discharge machining based on a machining shape input thereto, said apparatus comprising machining path defining means for defining a closed machining path from the machining shape input thereto; and program preparing means for preparing a program for die machining, said program repeating a plurality of machining processes along the closed machining path to thereby machine a workpiece into a die, wherein said program preparing means prepares the program so that approach points, which are machining-start points on the machining path, are different from each other in different machining processes.

6. The apparatus according to claim 5, wherein said program comprises a program in which a plurality of finish machining processes are repeated after coreless machining.

7. The apparatus according to claim 5, further comprising approach point defining means for obtaining points equally dividing the machining path by an input repetition number of the machining processes and defining each of the obtained points as an approach point for a different machining process.

8. The apparatus according to claim 7 wherein, when the obtained point is positioned within a first predetermined distance from a corner of the machining path or a curved section thereof having a curvature larger than a predetermined value, said approach point defining means defines, as an approach point, a point away from the corner or the curved section, along the predetermined machining path, by a second predetermined distance.

9. A wire-cut electric discharge machining apparatus comprising said apparatus according to claim 5.

10. A computer readable storage medium storing a program for allowing a computer to prepare a program for die machining used in wire-cut electric discharge machining, said program for die machining repeating a plurality of machining processes along a predetermined closed machining path to thereby machine a workpiece into a die, wherein, in accordance with said program stored in said storage medium, said computer prepares a program for die machining so that approach points, which are machining-start points on the machining path, are different from each other in different machine processes.

11. The storage medium according to claim 10, wherein said program for die machining comprises a program for die machining, in which a plurality of finish machining processes are repeated after coreless machining.

12. A method for carrying out die machining by wire-cut electric discharge machining, said method comprises:
repeating a plurality of machining processes along a predetermined closed machining path so that approach points, which are machining-start points on the closed machining path, are different from each other in different machining processes, thereby machining a workpiece into a die.

13. The method according to claim 12, further comprising steps of obtaining points equally dividing a circumferential length of the closed machining path by a repetition number of the machining processes; and defining each of the obtained points as an approach point for a different machining process.

14. The method according to claim 13, wherein the defining comprises:
defining, as an approach point, a point away from the corner or the curved section, along said predetermined machining path, by a second predetermined distance when the obtained point is positioned within a first predetermined distance from a corner of the machining path or a curved section thereof having a curvature larger than a predetermined value.

15. The method according to claim 12, wherein said die machining comprises machining in which a plurality of finish machining processes is repeated after coreless machining.

* * * * *